United States Patent
Sharma et al.

(10) Patent No.: US 9,008,502 B2
(45) Date of Patent: Apr. 14, 2015

(54) METHOD AND SYSTEM FOR PROTECTING TRAFFIC OF A PLURALITY OF WORK ODUS OVER A PROTECT ODU

(71) Applicant: Tejas Networks Limited, Bangalore (IN)

(72) Inventors: Nishant Sharma, Bangalore (IN); Nikhil Kumar Satyarthi, Bangalore (IN); Vivek Subramanian, Bangalore (IN)

(73) Assignee: Tejas Networks Limited, Bangalore, Karnataka (IN)

( * ) Notice: Subject to any disclaimer, the term of this patent is extended or adjusted under 35 U.S.C. 154(b) by 56 days.

(21) Appl. No.: 13/764,813

(22) Filed: Feb. 12, 2013

(65) Prior Publication Data
US 2013/0216217 A1 Aug. 22, 2013

(51) Int. Cl.
*H04J 14/08* (2006.01)
*H04J 3/16* (2006.01)

(52) U.S. Cl.
CPC ............... *H04J 14/08* (2013.01); *H04J 3/1652* (2013.01); *H04J 2203/006* (2013.01)

(58) Field of Classification Search
USPC ......................................................... 398/5, 8
See application file for complete search history.

(56) References Cited

U.S. PATENT DOCUMENTS

| | | | |
|---|---|---|---|
| 7,443,843 B2* | 10/2008 | Matsuo et al. | 370/386 |
| 8,078,051 B2* | 12/2011 | Arena | 398/8 |
| 2002/0024930 A1* | 2/2002 | Sestito | 370/224 |
| 2006/0120354 A1* | 6/2006 | Sohn et al. | 370/352 |
| 2010/0303456 A1* | 12/2010 | Matsukawa et al. | 398/8 |
| 2012/0189304 A1* | 7/2012 | Lin et al. | 398/43 |

\* cited by examiner

*Primary Examiner* — M. R. Sedighian
*Assistant Examiner* — Jose Luis F Pugeda
(74) *Attorney, Agent, or Firm* — Barry Choobin; Patent360 LLC

(57) ABSTRACT

The various embodiments herein provide a method and system for protecting multiple work ODU failures using a higher capacity protect ODU in an Optical Transport Network. The method for protecting multiple work ODU failures in an Optical Transport Network comprising steps of detecting signal failures in at least one of a plurality of work ODUs, requesting for release of one or more time-slots for a defective work ODU and allocating the one or more time-slots of a low priority traffic from the protect ODU in an incremental manner of priority. The method apply a TPN based policy for defining lower ODUs, performs handshaking between the transmit and downstream ends using the protocol provided, defines the role and behavior of the various system components and the service requests and performs an automatic lockout of protection for the work ODU in which an UDI alarm is present.

6 Claims, 13 Drawing Sheets

US 9,008,502 B2

METHOD AND SYSTEM FOR PROTECTING TRAFFIC OF A PLURALITY OF WORK ODUS OVER A PROTECT ODU

CROSS-REFERENCE TO RELATED APPLICATION

The present application claims priority of the Indian non-provisional application serial number 596/CHE/2012 filed on Feb. 17, 2012, and that application is incorporated in its entirety at least by reference.

BACKGROUND

1. Technical Field

The embodiments herein generally relate to optical transport networks (OTN) and particularly relate to protecting work optical channel data unit (ODU) failures in the optical transport networks.

2. Description of the Related Art

Telecommunication networks are experiencing a massive increase in the demand for capacity, particularly in relation to internet traffic. To support this demand economically, optical networks are evolving which include a dynamically reconfigurable optical transport layer, based on fast optical cross-connects (OXCs) coupled with a suitable control and management architecture. In the near future it is expected that an optical transport network (OTN) will be realized capable of supporting large numbers of high capacity optical channels (OChs), with bit rates of 10-40 Gb/s.

OTN belongs to the class of TDM networks like SDH/SONET networks. In TDM networks an agreement between a transmit/upstream end and a receive/downstream end need to be done for time-slots of the client entities which are contained by a server entity. With respect to OTN, for setting up a lower order ODU (client) trail between the upstream end and the downstream end, the ends have to agree for the time-slots which the lower order ODU occupies inside the higher order ODU (server). With respect to a protection group comprising multiple work ODUs and a higher capacity protect ODU, a fundamental problem which arises when a work ODU needs to be protected using the protect ODU is the time-slots the protected work ODU occupies inside the higher capacity protect ODU. The upstream and downstream end need to know at the time of protection switching these time slots which the protected work ODU occupies inside the protect ODU. At present none of the existing protocols or the protection mechanisms provide any means for communicating these time-slots over the protection protocol in the TDM world. In case of all the existing protection schemes in the TDM world whether it be linear protection or ring protection scheme, for a work entity which gets protected the protect time-slot is always known before hand. Say for example, in linear scheme MSP the time-slot of AU/TU in the protect section layer is the same as what is on the work. Hence a relation between work and protect time-slot is fixed. This is due to the reason that the work and the protect-entities forming the protection group were of same capacity in the prior art. Hence, in prior art the case where the work entities and protect entities are of dissimilar capacities is not discussed.

In the existing techniques, no known protocols exists to exchange the time-slots of the protected work ODU inside the protect ODU, furthermore the structure and behavior of the protection controller and the signaling sequences are not known and deterministic behavior with respect to various failure cases like user initiated external commands, priority of the entities needs to be defined and the protection mechanism must handle all these cases. Based on the aforementioned, a higher capacity protect ODU cannot protect multiple lower capacity work ODUs on failure even though bandwidth is available in the protect ODU based on the prior art TDM protection schemes.

There exists a need for a method and system for protecting multiple lower capacity work ODU failures using a protect ODU of higher capacity in an optical transport network.

The abovementioned shortcomings, disadvantages and problems are addressed herein and which will be understood by reading and studying the following specification.

SUMMARY

The primary object of the embodiments herein is to provide a method and system for simultaneously protecting multiple work ODU failures using a higher capacity protect ODU in an optical transport network.

Another object of the embodiments herein is to provide a method and system for protecting multiple work ODU failures without the need to communicate the time-slots of the protected client ODUs inside server protect ODU over the protection PCC bytes.

Yet another object of the embodiments herein is to provide a method and system with a protocol to exchange messages between the transmitting and receiving ends for the transmit end bridging and the receive end switching to avoid misconnection.

Yet another object of the embodiments herein is to provide a method and system for protecting multiple work ODUs which enables faster protocol convergence to increase the response of traffic protection mechanism.

Yet another object of the embodiments herein is to provide a method and systems for protecting multiple work ODU failures by optimizing protect ODU bandwidth usage.

The various embodiments herein provide a method for protecting traffic of a plurality of work ODUs over a protect ODU (Optical Channel Data Units). The method comprising steps of detecting signal failures in at least one of a plurality of work ODUs, requesting for release of one or more time-slots for a defective work ODU and allocating the one or more time-slots from the protect ODU based on the request. Here the one or more time slots are allocated in an incremental manner of priority.

According to an embodiment herein, the method of allocating the one or more time-slots from the protect ODU comprising steps of inputting a signal status of at least one of the plurality of work ODUs and the protect ODU, analyzing availability of time-slots, dropping at least one of a plurality of low priority extra traffic client entities and protected work ODUs when free time-slots are not available, providing a list of free time slots for protecting the defective work ODU and switching the traffic from the protect ODU for protecting the defective work ODU.

According to an embodiment herein, the method of switching the traffic from the protect ODU for protecting the defective work ODU comprising steps of signaling a bridge release request for the dropped low priority extra traffic client entities and the protected work ODUs, releasing a bridged traffic for the extra traffic client entities and the protected work ODUs on receiving the bridge release request, providing a bridge release indication, caching a signaling information on receiving the bridge release indication, signaling a bridge engage request to bridge traffic for the defective work ODU, requesting for a grant of free time-slots for the defective work ODU for which the bridge engage request is received, bridging the traffic for the defective work ODU on the protect ODU, signaling the bridging of traffic by sending a bridge engage indication and switching the traffic of the defective work ODU from the protect ODU on receiving the bridge engage indication.

According to an embodiment herein, the method for protecting traffic of a plurality of work ODUs over a protect ODU further comprising defining a policy to channelize lower order ODUs inside a higher order protect ODU, wherein the policy includes a TPN based policy where each of the work entity is assigned with a unique TPN.

Embodiments herein further disclose a system for protecting traffic of a plurality of work ODUs over a protect ODU. The system comprising a signal monitor to monitor signal status of the plurality of work ODUs and the protect ODU, a time-slot controller to determine a number of timeslots to protect the defective work ODU, a time-slot book-keeper for providing a list of available time slots for protecting the defective work ODU, a switch fabric to bridge or switch the traffic for the ODUs and a protection controller to provide instruction to allocating one or more time-slots of a low priority traffic from the protect ODU to protect the defective work ODU.

According to an embodiment herein, the system further comprises a downstream protection subsystem at a downstream end of a protection domain. The downstream protection subsystem comprises a signal monitor, a downstream protection controller to request for release of time-slots for a defective work ODU based on the signal status indications provided by the signal monitor, command a switch fabric and send bridge engage and drop requests to the upstream end as commanded by the time-slot controller, a downstream time-slot controller to determine the number of timeslots to protect the defective work ODU and commanding the downstream protection controller to drop a plurality of lower priority extra traffic client entities and the protected work ODUs on the protect ODU, a downstream switching fabric for engaging or dropping at least one of work ODUs and extra traffic client entities inside protect ODU and a downstream overhead monitor/inserter for providing the received overhead bytes to the downstream protection controller and transmit the overhead bytes provided by the protection controller.

According to an embodiment herein, the system further comprises an upstream protection subsystem at the upstream end of the protection domain. The upstream protection subsystem comprising a time-slot book-keeper for maintaining and providing a list of free time slots for protecting the defective work ODU for which the downstream end has sent a bridge engage request, an upstream protection controller to request for a grant of list of free time slots to the time-slot book-keeper, an upstream overhead monitor/inserter for providing the received overhead bytes to the protection controller and transmit the overhead bytes provided by the protection controller and an upstream switch fabric to engage and drop bridge of the traffic for the work ODUs and extra traffic client entities on the protect ODU based on instructions from the protection controller.

According to an embodiment herein, the downstream protection controller is further adapted to command the downstream switch fabric to drop the extra traffic client entities inside the protect ODU to get the timeslots, command the downstream switching fabric for dropping protected work ODUs inside the protect ODU to get the timeslots, signal bridge release request for the dropped extra traffic client entities and protected work ODUs to the upstream end and cache the signalling information on receiving a bridge release indication from the upstream end, transmit the signal bridge engage request towards the upstream end to bridge traffic for the defective work ODU on reception of bridge release notifications for the dropped extra traffic client entities and protected work ODUs from the upstream end and command the switch fabric to switch the traffic from protect for work ODU on receiving the indication of bridging done on the upstream end.

According to an embodiment herein, at least one of an operator or a network management system assigns priority to each of the work ODUs and the extra traffic client ODU inside the protect ODU.

According to an embodiment herein, the protection related actions at the upstream end and the downstream end are coordinated through a protocol messaging carried over the overhead bytes on the protect ODU.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
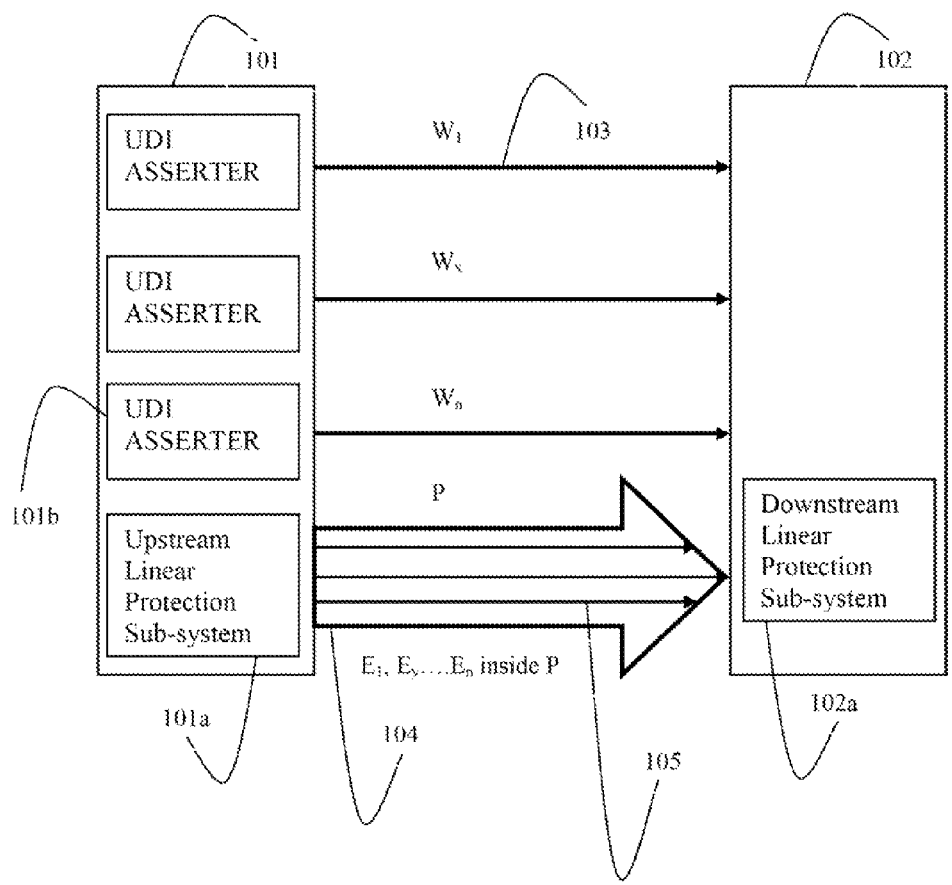
FIG. 1 is a schematic diagram illustrating a system for protecting multiple lower capacity work ODUs using a higher capacity protect ODU with a unidirectional traffic flow, according to an embodiment of the present disclosure.

Although the specific features of the present disclosure are shown in some drawings and not in others. This is done for convenience only as each feature may be combined with any or all of the other features in accordance with the present disclosure.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for protecting traffic of a plurality of work ODUs over a protect ODU (Optical Channel Data Units). The method for protecting traffic of a plurality of work ODUs over a protect ODU (Optical Channel Data Units) comprising detecting signal failures in at least one of a plurality of work ODUs, requesting for release of one or more time-slots for a defective work ODU and allocating the one or more time-slots of a low priority traffic from the protect ODU. The one or more time slots are allocated in an incremental manner of priority.

The method for protecting multiple work ODU failures using a higher capacity protect ODU in an Optical Transport Network comprises detecting signal failures in at least one of a plurality of work ODUs and a protect ODU, inputting the signal status monitored for at least one of a work ODU and protect ODU to a protection controller at a downstream end, requesting a time-slot controller for release of time-slots for a defective work ODU by the protection controller at the downstream end, commanding the protection controller to drop at least one of a plurality of lower priority extra traffic client entities and protected work ODUs in the protect ODU at the downstream end, instructing a switching fabric for dropping the lower priority extra traffic client entities inside the protect ODU to get the timeslots at the downstream end, instructing a switching fabric for dropping the lower priority protected work ODUs inside the protect ODU to get the timeslots at the downstream end, signaling bridge release request for the lower priority dropped extra traffic client entities and protected work ODUs to the upstream end by the downstream end, the protection controller at the upstream end commanding a switch fabric to release the bridged traffic for the extra traffic client entities and the protected work ODUs on receiving a bridge release request from the downstream end, providing a bridge release indication to the downstream end by the upstream end, caching the signaling information on receiving a bridge release indication from the upstream end by the downstream end, the protection controller at the downstream end signaling bridge engage request towards the upstream end to bridge traffic for the defective work ODU, the protection controller at the upstream end requesting the time-slot book-keeper for grant of free time-slots for the defective work ODU for which it has received a bridge engage request from the downstream end, providing a list of free time slots for protecting the defective work ODU to the protection controller by the time-slot book-keeper at the upstream end, the protection controller at the upstream end commanding a switch fabric to bridge the traffic of the defective work ODU on the protect ODU on the time slots on successful grant of a list of time slots by the time-slot book-keeper, signaling the bridging of traffic by sending the message bridge engage indication to the downstream end by the upstream end and commanding the switch fabric to switch the traffic from protect for the defective work ODU on receiving the indication of bridging done by the upstream end on the downstream end.

The protection related actions at the upstream end and the downstream end are coordinated through a protocol messaging carried over the overhead bytes on the protect ODU.

The method for protecting multiple work ODU failures using a higher capacity protect ODU in an Optical Transport Network further comprises assigning priority to each of the work ODU and assigning priority to each of the extra traffic client ODUs inside the protect ODUs. The time slot controller assigns order of acquisition and order of restoral of protect time slots based on a plurality of parameters.

The method for protecting multiple work ODU failures using a higher capacity protect ODU in an Optical Transport Network further comprises defining a format for transmitting commands over overhead bytes between the upstream and downstream end.

The downstream end detects an UDI alarm and leads to an automatic lockout of the work ODU from using the protection by the downstream protection controller. Here the lock-out-of protection means that a particular entity will be prevented from getting protected, in other words, a particular entity will be locked out of protection switching. The method for protecting multiple work ODU failures using a higher capacity protect ODU in an Optical Transport Network further comprises defining a TPN based policy to channelize lower order ODUs inside the higher order protect ODU.

The system for protecting multiple work ODU failures using a higher capacity protect ODU in an Optical Transport Network comprises a downstream protection subsystem at the downstream end of the protection domain comprising, a signal monitor to monitor signal status of a plurality of work ODUs and a protect ODU, a downstream protection controller to request for release of time-slots for a defective work ODU based on the signal status indications provided by the signal monitor, command a switch fabric and send bridge engage and drop requests to the upstream end as commanded by the time-slot controller, a time-slot controller to determine the number of timeslots to protect the defective work ODU and commanding the protection controller to drop a plurality of lower priority extra traffic client entities and the protected work ODUs on the protect ODU based on a plurality of parameters to free up the required number of time-slots to protect the defective work ODU, a downstream switching fabric for engaging or dropping at least one of work ODUs and extra traffic client entities inside protect ODU based on the instructions from the protection controller and a downstream overhead monitor/inserter for providing the received overhead bytes to the protection controller and transmit the overhead bytes provided by the protection controller.

The upstream protection subsystem at the upstream end of the protection domain further comprises a time-slot book-keeper for maintaining and providing a list of free time slots for protecting the defective work ODU for which the downstream end has sent a bridge engage request, an upstream protection controller to request for a grant of list of free time slots to the time-slot book-keeper, command a switch fabric and send bridge engage and drop indications to the downstream end, an upstream overhead monitor/inserter for providing the received overhead bytes to the protection controller and transmit the overhead bytes provided by the protection controller, and an upstream switch fabric to engage and drop bridge of the traffic for the work ODUs and extra traffic client entities on the protect ODU based on instructions from the protection controller.

The downstream protection controller is further adapted to command the downstream switch fabric to drop the extra traffic client entities inside the protect ODU to get the timeslots, command the downstream switching fabric for dropping protected work ODUs inside the protect ODU to get the timeslots, signal bridge release request for the dropped extra traffic client entities and protected work ODUs to the upstream end, cache the signaling information on receiving a bridge release indication from the upstream end, signal bridge engage request towards the upstream end to bridge traffic for the defective work ODU on reception of bridge release indications for the dropped extra traffic client entities and protected work ODUs from the upstream end and command the switch fabric to switch the traffic from protect to work ODU on receiving the indication of bridging done on the upstream end.

The time slot controller is adapted to assign order of acquisition and order of restoral of protect time slots based on a plurality of parameters. At least one of the operator and a network management system assigns priority to each of the work ODU and the extra traffic client ODU inside the protect ODU.

FIG. 1 is a schematic diagram illustrating a system for protecting multiple lower capacity work ODUs using a higher capacity protect ODU with a unidirectional traffic flow, according to an embodiment of the present disclosure. The system comprises a linear protection switching domain including at least one upstream end 101 with a linear upstream protection subsystem 101a and at least one downstream end 102 with a linear downstream protection subsystem 102a. The protection switching domain includes a plurality of work entities 103 (W1, Wx ... Wn) defined at the upstream end 101 and similarly at the downstream end 102. The system further comprises a protection entity (P) 104 having a plurality of extra traffic client entities 105, an UDI assertor 101b for each of the work entities at the upstream end for indicating any upstream failures and transmitting the same over the PCC overhead bytes of the protect ODU.

The system herein further comprises a plurality of lower order Optical Channel Data Units (ODUs) defined inside a higher order ODU using a TPN based policy. In TPN based policy, the connection between two lower order ODUs in a network is identified using the TPN of the lower order ODUs. The TPN herein refers to a Tributary Port Number of the lower order ODUs defined inside a higher order ODU. For a lower order ODU with a fixed TPN, the transmitted timeslots can change and the receive end can detect this change based on the de-multiplex of the lower order ODU from the higher order ODU.

The system employs a protocol based messaging to carry protection related messages between the upstream end 101 and the downstream end 102. The system performs an automatic lockout of the work entity in which an UDI alarm (Upstream Defect Indication) is detected and prevents the protection of the respective work entity by the downstream controller at the downstream end 102. The upstream linear protection sub-system 101a and downstream linear protection sub-system 102a are described in detail in the following sections.

Figure 2:
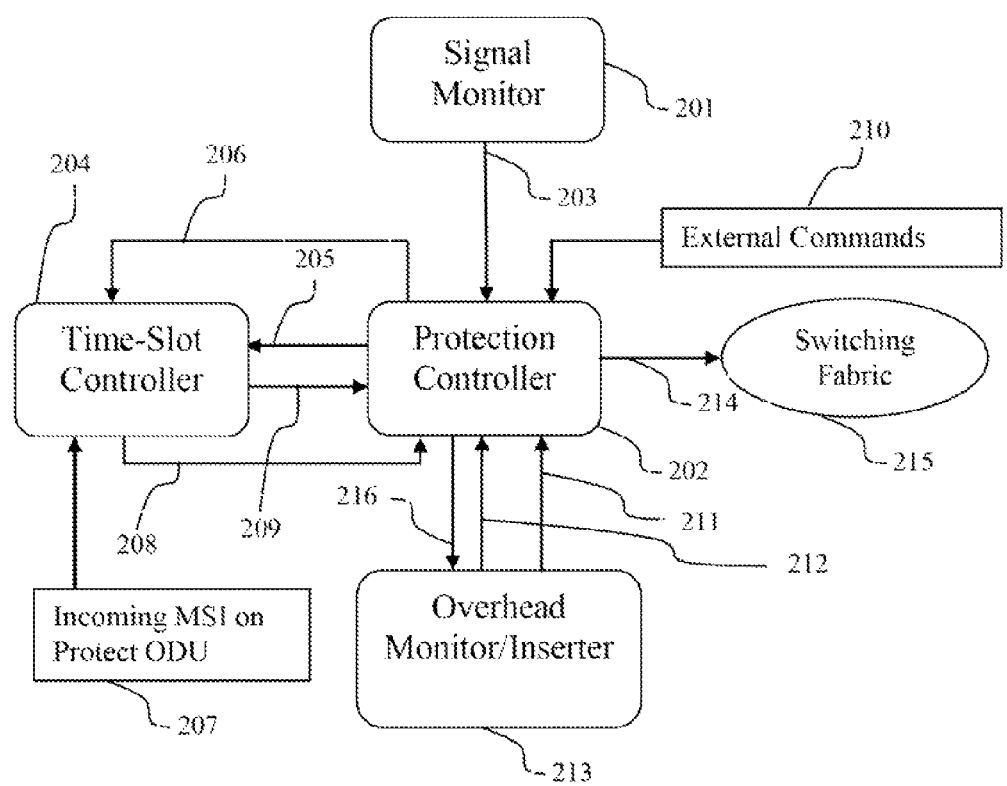
FIG. 2 illustrates a block diagram of a downstream protection sub-system, according to an embodiment of the present disclosure.

FIG. 2 illustrates a block diagram of the downstream linear protection sub-system, according to an embodiment of the present disclosure. The downstream linear protection sub-system comprises a signal monitor 201, a time-slot controller 204, a protection controller 202, a means to provide external commands 210, a switching fabric 215 and an overhead monitor and inserter 213. The signal monitor 201 monitors the signal flow of the work ODUs and the protect ODU and detects if there is any signal failure or defects in the work ODUs and the protect ODU. The signal monitor 201 feeds the monitored signal status as indicated by the arrow 203 to the protection controller 202. The protection controller 202 contacts a time-slot controller 204 for requesting/releasing of the time-slots for work ODU and provides the protection controller state variables to the time-slot controller 204 as shown by the arrows 205 and 206 respectively. The time slot controller 204 is also provided with Multiplex Structure Identifier (MSI) on protect ODU 207.

The time slot controller 204 determines the number of timeslots required to protect the defective work ODU and subsequently inserts or drops other low priority work entities or extra traffic client entities inside protect ODU to provide the required number of timeslots for the defective work ODU as shown by arrow 208. Based on the availability of the time slots, the time slot controller 204 allots or denies the requested number of time slots for the work ODU as indicated by the arrow 209.

The protection controller 202 analyzes the signal status information from the signal monitor 201, the time-slot allocation indication from the time slot controller 204, the instruction provided through the external commands 210, the UDI alarm status for work ODUs 211, instructs the overhead inserter 213 to send protocol messages as indicated by the arrow 216, analyzes the incoming protocol messaging over the protection bytes 212 and instructs the switching fabric 215 to switch the traffic for work entity or reinsertion/drop for extra traffic client entities inside protect ODUs as indicated by the arrow 214.

Figure 3:
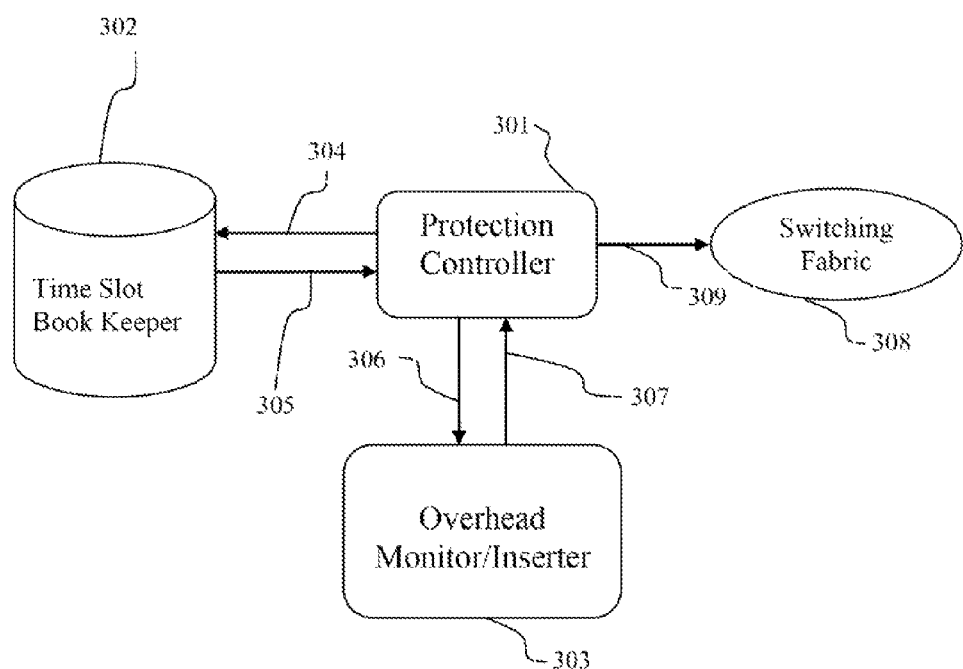
FIG. 3 illustrates a block diagram of an upstream protection sub-system, according to an embodiment of the present disclosure.

FIG. 3 illustrates a block diagram of the upstream protection sub-system, according to an embodiment of the present disclosure. The upstream protection sub-system comprises an upstream protection controller 301, a time-slot book keeper 302, an upstream switching fabric 308, and an overhead monitor/inserter 303. The protection controller 301 contacts time-slot book keeper 302 for request/release of the required time slots as indicated by the arrow 304 for the work ODU for which it has received a bridge engage/release request from the downstream end. The time-slot book keeper 302 then sends the grant of list on N time slots or denial of time-slots to the protection controller 301 as shown by the arrow 305. The arrow 306 represents the protection controller 301 commanding the overhead monitor/inserter 303 for transmitting protection messages over PCC bytes on protect ODU. The arrow 307 represents overhead monitor/inserter 303 sending the received protection messages on PCC bytes to the protection controller 301. The protection controller 301 instructs the switching fabric 308 to bridge or drop the traffic of the work ODUs or extra traffic client ODUs inside the protect ODU as indicated by the arrow 309.

Figure 4:
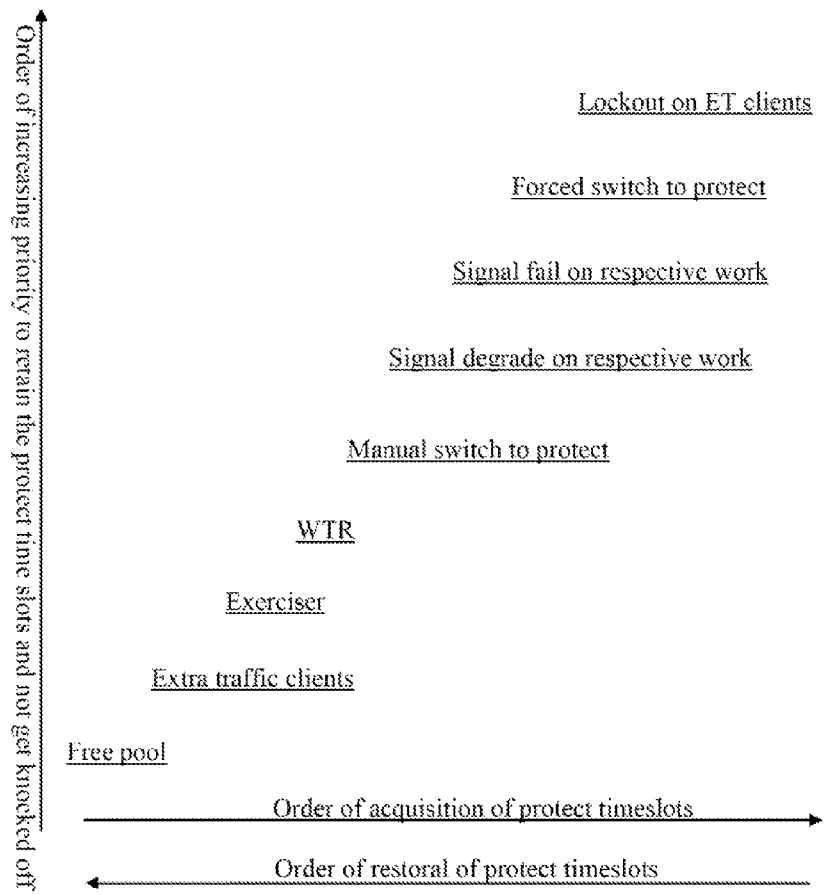
FIG. 4 is a chart illustrating the order of acquisition and restoral of timeslots by a timeslot controller, according to an embodiment of the present disclosure.

FIG. 4 is a chart illustrating the order of acquisition and restoral of timeslots by the downstream timeslot controller, according to an embodiment of the present disclosure. The order of acquisition of the protect timeslots or the order of restoral of protect timeslots is mapped in an order of increasing priority to retain the protect time slots and getting knocked off. The priority factors comprises of protect time slots available in the free pool, extra traffic clients, exerciser being serviced for work entities, WTR active on work entities, manual switch to protect for work entities, signal degrade on work entities, signal fail on work entities, forced switch to protect on work entities and lock out of extra traffic client entities. For a better understanding of the restoral policy an example is described as follows. Say, the protection controller requests the time-slot controller for N time-slots for a work entity on which a failure has been detected or external command is issued. As per the chart, the time-slot controller knocks-off entities one by one till it gets at least N number of time-slots. The time-slot controller first looks for those many time-slots (N) in the free pool (the protect time-slots neither being used for carrying extra traffic nor to protect any work entity are said to be in free pool). If N time-slots are not acquired still, the time-slot controller will next drop the extra traffic client entities in order of increasing priority among the extra traffic client entities until at least N time-slots are acquired. If N time-slots couldn't be acquired still, the time-slot controller will next drop the work entities which are using protect time-slots to service exerciser external command in order of increasing priority. If N time-slots couldn't be acquired still, the work entities that are using protect entities but are in WTR are dropped one by one in order of increasing priority. Similarly, for manual switch/signal fail/signal degrade/forced switch. The extra traffic client entities which are locked out from being dropped are never considered to be dropped and free the required number of time-slots. The process of dropping or knocking-off is stopped when at least N numbers of time-slots have been acquired. Apart from this general knocking-off procedure, it has to be ensured that at no time a lower priority request should knock-off a higher priority request. For example, to acquire N time-slots for a work entity having signal degrade one should not knock-off any work entity which is using protect time-slots due to signal fail on it. Similarly, to acquire N time-slots for a work entity having signal fail one should not knock-off any work entity which is using protect time-slots due to forced switch external command active on it. In case there is a tie between the request on the work entity for which N time-slots are required and an entity which is to be knocked-off to free up the required time-slots, the priority of work entities need to be considered. In this case of tie, a lower priority work entity can't knock-off a higher priority work entity and knocking-off process is halted. Here two factors decide the total priority, the request being served (signal fail/signal degrade/external command) (first level) and the relative priority number assigned to each of the work entities and extra traffic client entities (second level). In the chart, the first level priorities are shown. In case of same first level priority, the second level priority moves the time-slot controller's decision making process.

Figure 5:
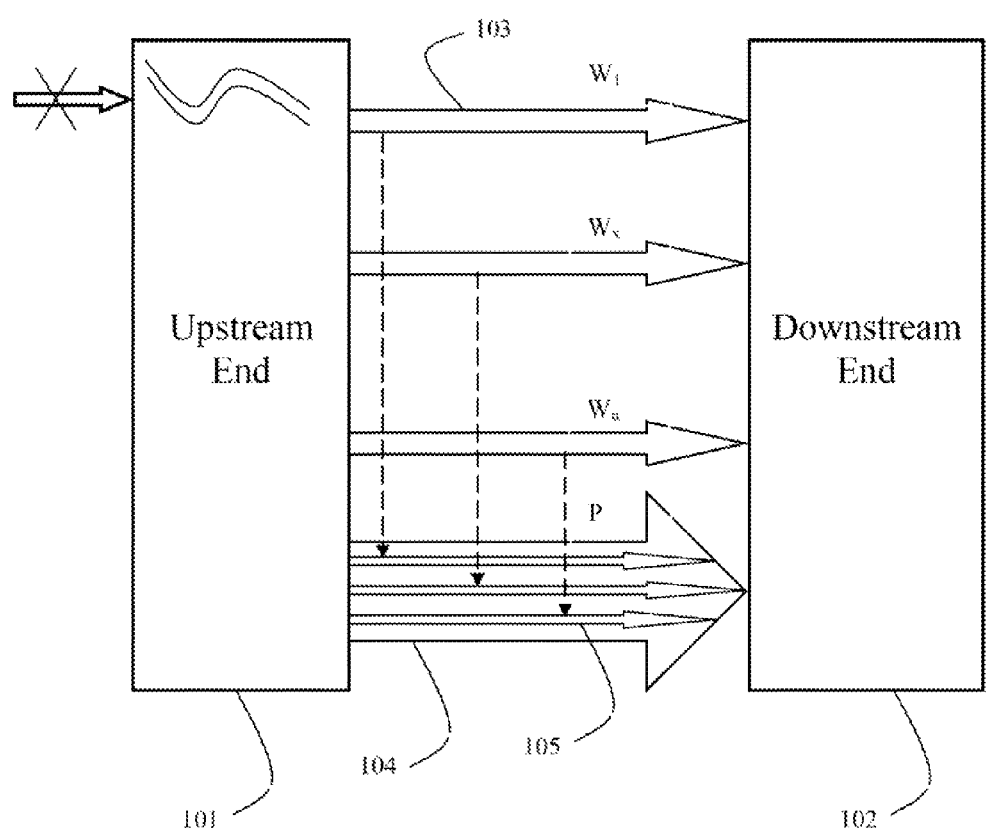
FIG. 5 illustrates an assertion of an upstream defect indication to the downstream end when there is a signal fail at the upstream end, according to an embodiment of the present disclosure.

FIG. 5 illustrates an assertion of an upstream defect indication to the downstream end when there is a signal fail at the upstream end, according to an embodiment of the present disclosure. The upstream end 101 sends an upstream defect indication alarm to the downstream end 102 on the protect ODU 104 for each of the work entities 103 (W1, Wx ... Wn) over the PCC overhead byte. The upstream defect indicator alarm is invoked to indicate a signal failure in at least one of the plurality of upstream multiplexed sub-entities present at the upstream end. The upstream defect indicator alarm is declared at the upstream end 101 and transmitted to the downstream end 102 to determine a protection decision.

The UDI alarm detected by the downstream end leads to automatic lock out of the respective work entity from using the protection by the downstream protection controller. This is mostly done in case of pass through connection of work ODU in which case if there is an upstream failure, then there is no use on protecting that work ODU. This in turn leads to an intelligent optimized protect band width usage.

Figure 6:
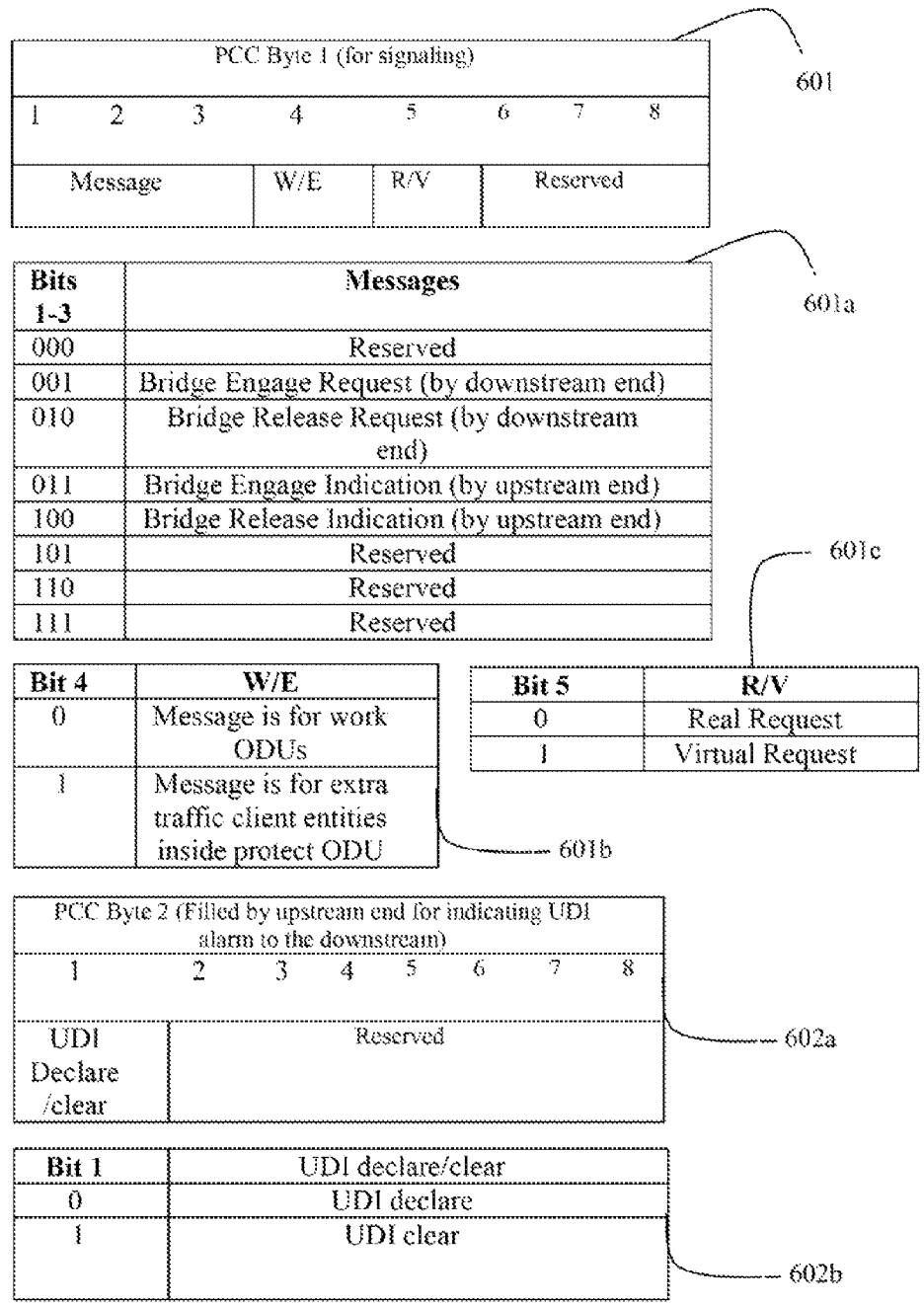
FIG. 6 is a block diagram illustrating the meaning of various bit fields of the PCC bytes 1 and 2, according to an embodiment of the present disclosure.

FIG. 6 illustrates the meaning of various bit fields of the PCC bytes 1 and 2, according to an embodiment of the present disclosure. The block 601 shows the PCC byte 1 for protection signaling. The bits 1, 2, 3 are used to send the bridge requests (sent by the downstream end) and indications (acknowledgement sent from the upstream end), bit 4 indicates if the message is for a work ODU or for an extra traffic client ODU inside the protect ODU, bit 5 means that if the message is real or virtual and bits 6, 7, 8 are reserved for future use. The bit 4 will be 0 if the message is for work ODUs and bit 4 will be 1 if the message is for extra traffic clients ODUs inside protect ODU as shown in block 601b. The block 601a indicates the various bit values being transmitted over the bits 1-3 and the corresponding messages compatible with the actions happening at the downstream end and upstream end. The value of bit 5 conveys a real request or virtual request as shown in block 601c. The bit value 0 indicates a real request and a bit value 1 indicates a virtual request. Generally for all request and response the bit value is set to real (R). For the request/response which are served as part of exerciser external command issued on the downstream end, the bit value is set to Virtual (V) in the protocol exchange. The exerciser command is issued just like any other external command on the downstream end. The purpose of this command is to check the signaling between the downstream and upstream end without causing any extra traffic drop or any bridge/switch action at either of the ends. In other words, the virtual bit conveys the message that nothing has to be done by the upstream end to either drop the extra traffic bridge or to bridge the corresponding work traffic on which work ODU exerciser has been issued. The virtual request conveys the upstream end and the downstream end not to do anything which affects the traffic flow in the network and only do the signaling without bridge/switch/squelch activities.

The block 602a indicates the PCC byte 2 which is filled up the upstream end for indicating UDI alarm to the downstream end. The bit 1 as shown in block 602b is assigned 0 if there is an UDI declared at the upstream end and bit 1 is assigned a value 1 when the UDI is cleared at the upstream end.

Figure 7:
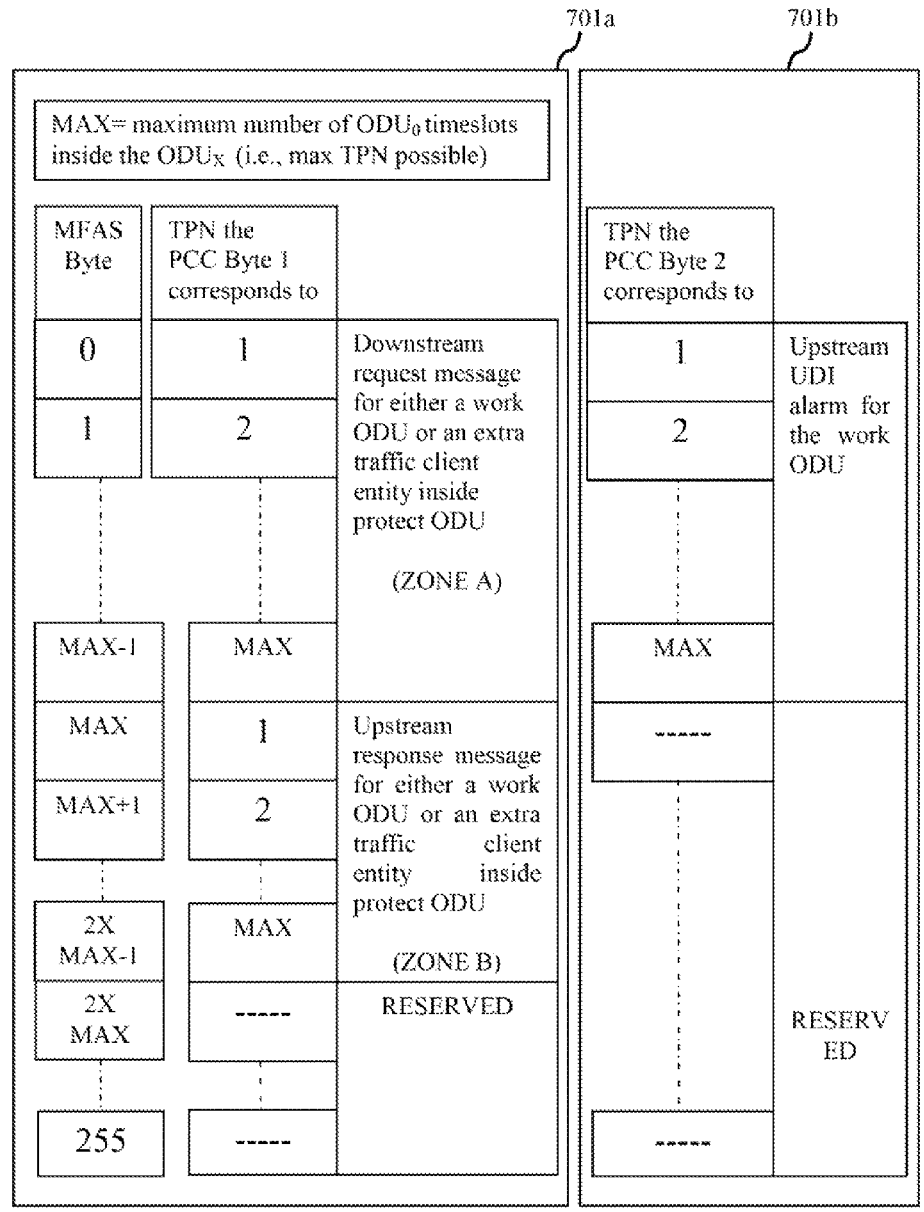
FIG. 7 illustrates the messages carried by the PCC bytes across different OTU frames corresponding to the multi-frame alignment signal (MFAS), according to an embodiment of the present disclosure.

FIG. 7 illustrates an automatic protection switching messaging over multi-frames on the protect optical data path unit, according to an embodiment of the present disclosure. The multiframe alignment signal (MFAS) byte is used to extend command and management functions over several frames. The MFAS counts from 0 to 255, providing a 256 multiframe structure. The value of the MFAS byte is incremented for each ODUx frame providing 256 values indicating the number of the frame within a multi-frame. The MFAS byte is used to synchronize bytes of multiframes.

As shown in block 701a, on an outgoing/transmitted PCC byte on the protect ODU, Zone A is to be filled by the downstream end and Zone B is to be filled by the upstream end according to illustrations of the upstream and downstream end for a unidirectional traffic flow as per the embodiments of the present disclosure. For MFAS byte 0, the PCC byte 1 corresponds to TPN 1 and for MFAS byte 1, the PCC byte 1 corresponds to TPN 2. The PCC byte 1 corresponds to maximum value of TPN MAX, the MFAS byte would be MAX−1. Here MAX refers to the maximum number of ODU0 timeslots inside the ODUx i.e the maximum TPN possible. Similarly for MFAS bytes MAX, MAX+, 2×MAX−1, the PCC byte 1 corresponds to TPN 1, 2, MAX, respectively. For, MFAS bytes 2×MAX to 255, the PCC 1 byte have been reserved for future use.

The PCC byte 2 corresponds to TPN 1 for an MFAS byte 0, 2 for an MFAS byte 1 and MAX for MFAS byte MAX−1 as shown in block 701b. This is filled by the upstream end on the outgoing PCC byte 2 according to the illustration of the upstream end for a unidirectional traffic flow as per the embodiments of the present disclosure.

Figure 8A:
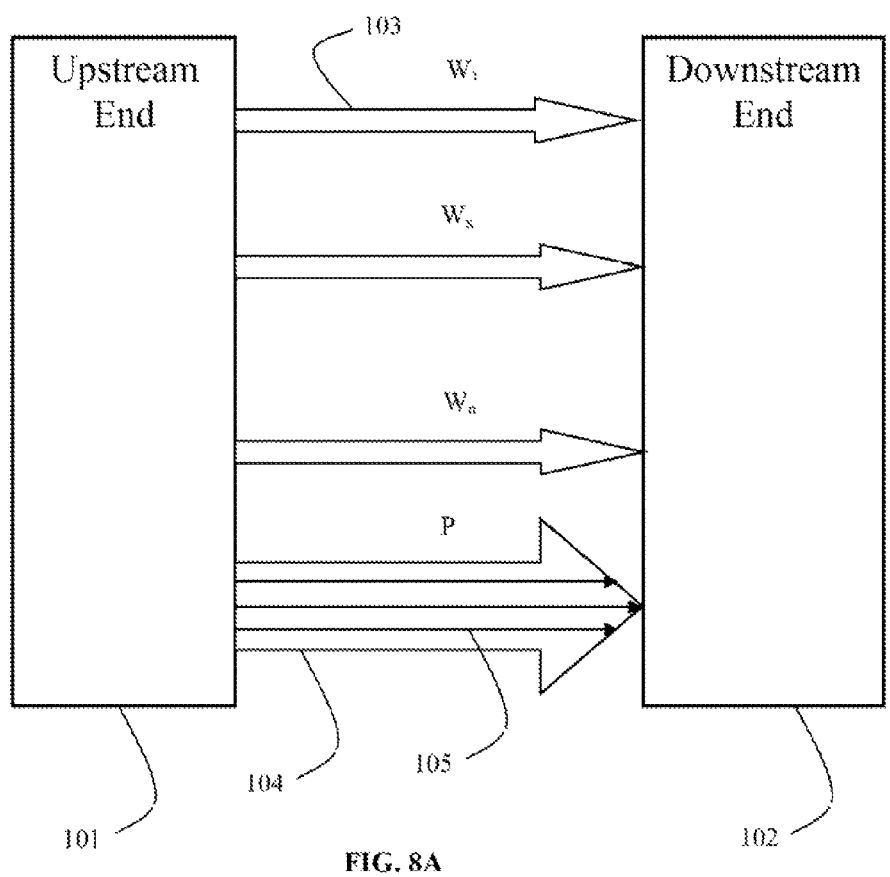
FIG. 8 illustrates the signaling process in case of no failures on work entities and no UDI alarm, according to an embodiment of the present disclosure.
Figure 8B:
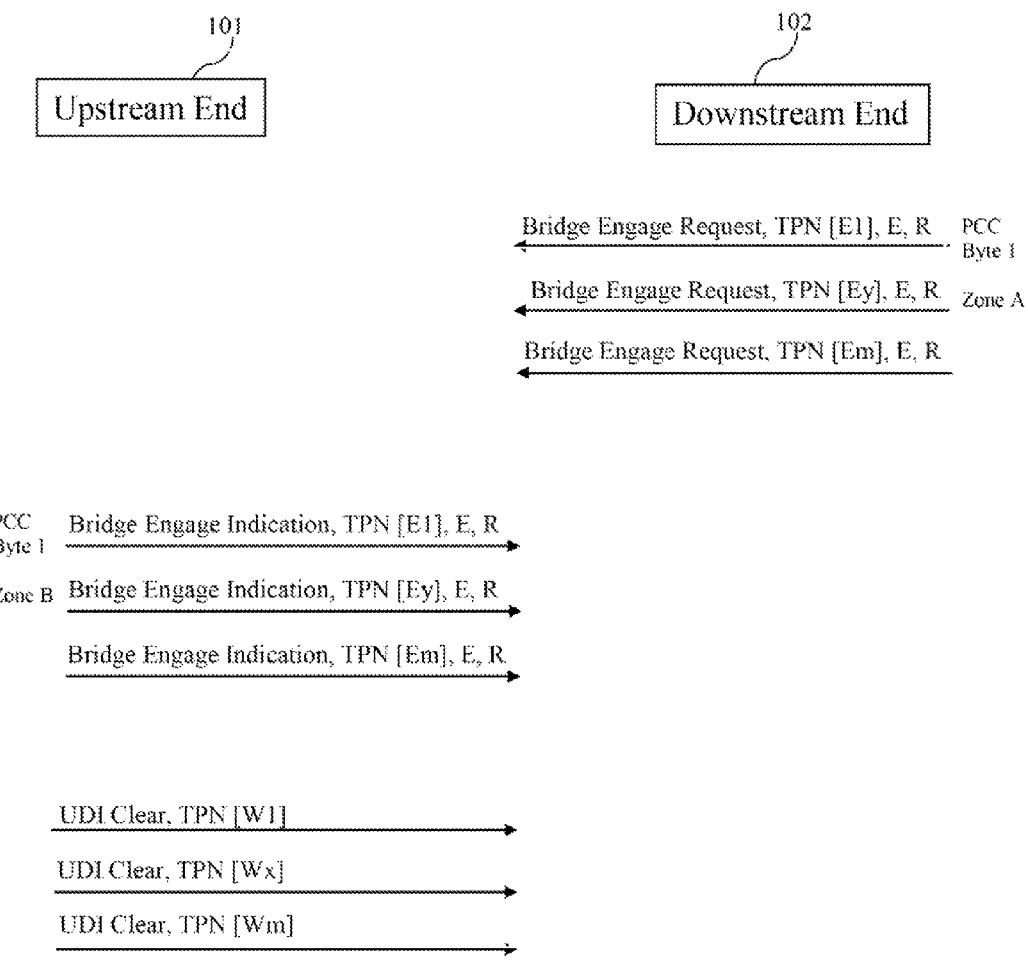

FIG. 8 illustrates the signaling process in case of no failures on work entities and no UDI alarm, according to an embodiment of the present disclosure. In this condition, no work entity needs to use the protect ODU. Hence the bridge engage requests sent by the downstream end are for the extra traffic client entities E1, Ey, Em and the bridge engage indications sent by the upstream end are for the extra traffic client entities E1, Ey, Em.

The downstream end 102 sends bridge engage requests (TPN[E1], E; TPN[Ey], E; TPN[Em], E) to the upstream end 101. Here TPN [Ey] means TPN of the extra traffic client entity Ey inside the protect ODU.

After receiving bridge engage requests from the downstream end 102, the upstream end 101 sends bridge engage indication (TPN[E1], E; TPN[Ey], E; TPN[Em], E) to the downstream end 102 as an upstream response message for the extra traffic client ODUs E1, Ey, Em inside the protect ODU. The upstream end 101 also declares UDI clear for TPN [W1], TPN [Wy] . . . TPN [Wm] for the plurality of work entities W1, Wy . . . Wm. Here TPN[Wx] refers to the TPN assigned to the work entity Wx. Each of the work entities will have a unique TPN assigned to it once the work entity is associated with a protection group. This auto allocation of the unique TPN is done by the management entity which understands the protection group.

Figure 9A:
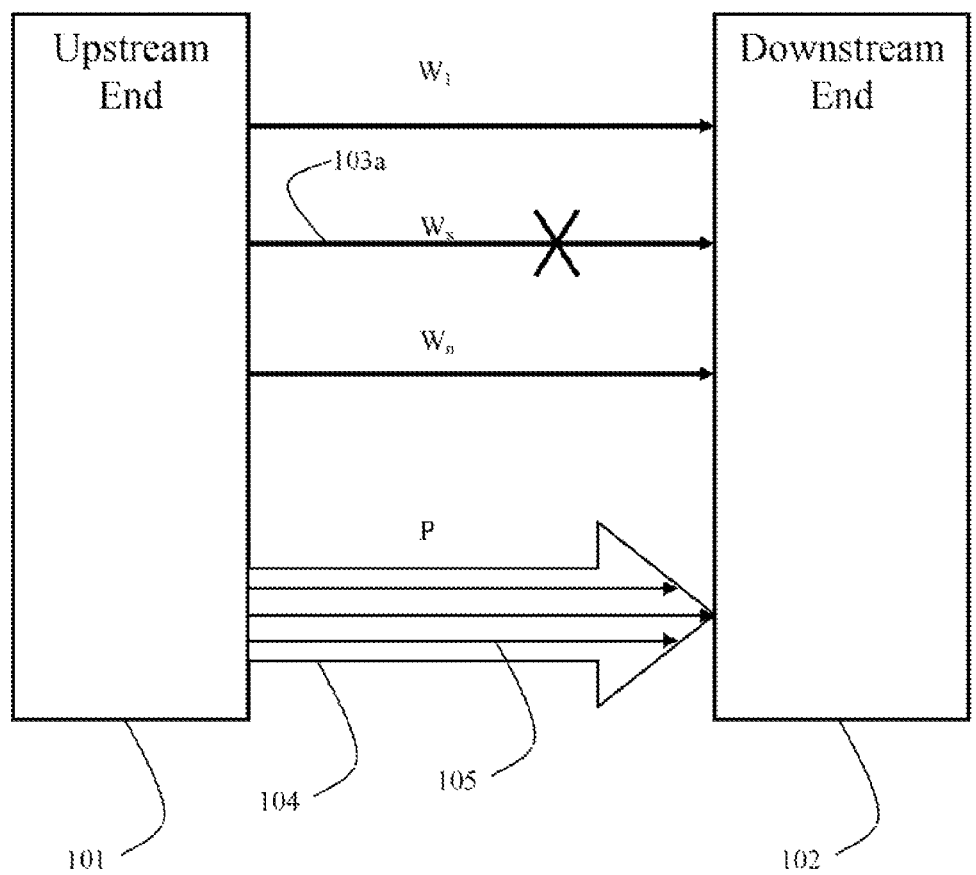
FIG. 9 is an exemplary illustration of a signaling process during a signal fail on work entity (Wx) when no time-slots are available in the free pool and there is no other failure on the downstream end, according to an embodiment of the present disclosure.

FIG. 9 is an exemplary illustration of a signaling process during a signal fail on work entity (Wx) when no time-slots are available in the free pool and there is no other failure on the downstream end, according to an embodiment of the present disclosure. As shown in FIG. 9A, the signal failure happens on the work entity Wx 103a. On failure on Wx, the downstream protection controller checks if there is any lockout on Wx. The lockout may be due to manual lockout done by the operator or automatic lockout due to UDI alarm due to upstream failure. In case, there is a lockout on Wx no action is taken.

Figure 9B:
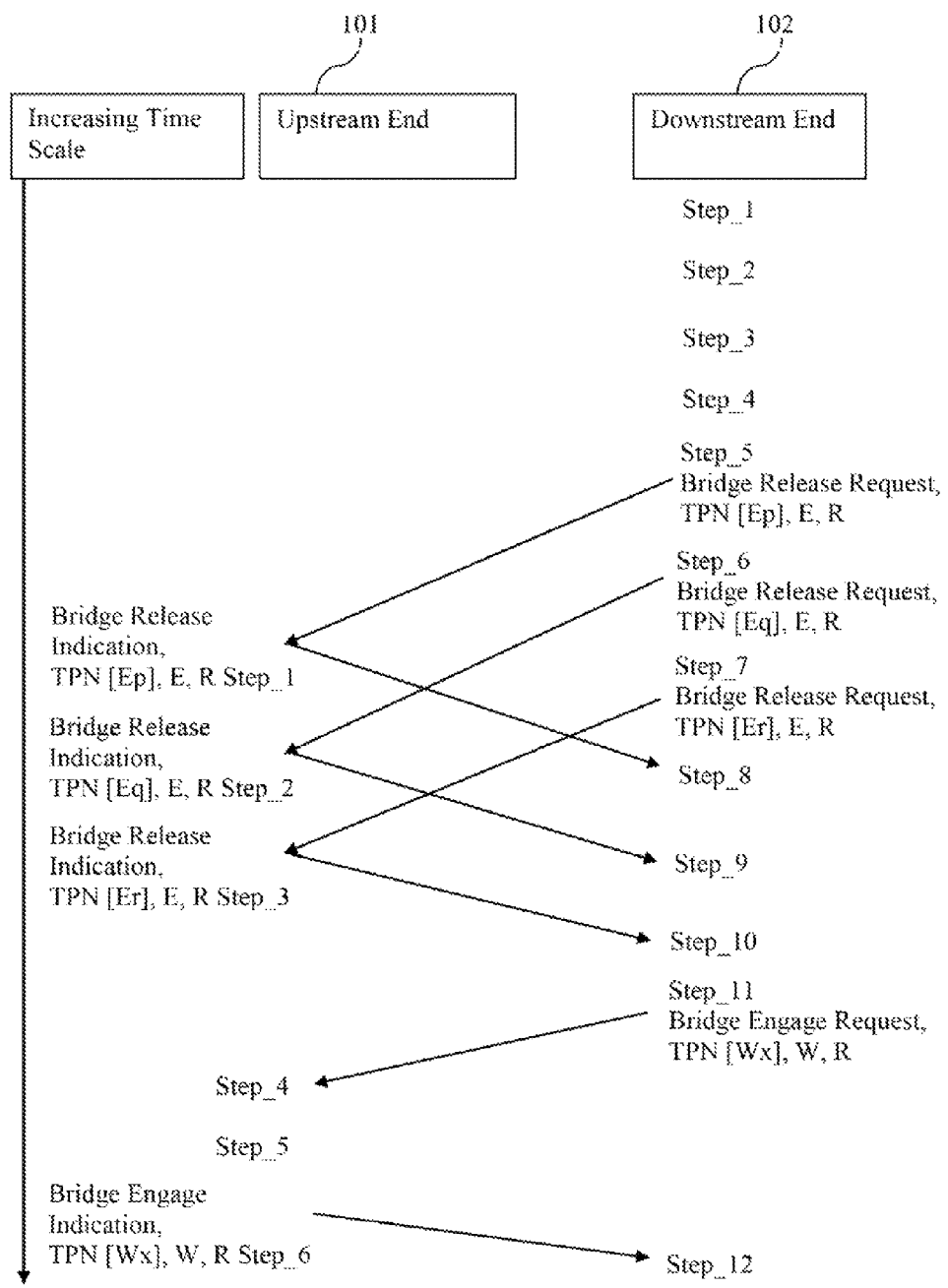

In case there is no lockout on Wx, the downstream protection controller requests the time-slot controller for N[Wx] number of time-slots as shown in FIG. 9B. The time-slot controller then based on policy as per FIG. 4, decides to drop extra traffic client entities Ep, Eq, Er inside the protect ODU so as to get a minimum of N[Wx] number of time-slots. The time-slot controller instructs the protection controller to drop Ep, Eq and Er. The protection controller commands the switch fabric to drop the extra traffic out of Ep, Eq, Er and squelching is performed to avoid misconnection.

The downstream protection controller signals "Bridge Release Request for (TPN [Ep], E; TPN[Eq], E and TPN[Er], E)" towards the upstream end 101. On receiving "Bridge Release Request, TPN [Ep], E" from the downstream end, the upstream protection controller commands the switch fabric to drop the bridge of the extra traffic for the Ep on protect. The upstream protection controller guides the time-slot book keeper to free the corresponding N[Ep] time-slots and signals "Bridge Release Indication, TPN[Ep], E" to the downstream end 102. Similarly on receiving "Bridge Release Request, TPN[Eq], E", the upstream protection controller commands the switch fabric to drop the bridge of the extra traffic for the Eq on protect. The upstream protection controller guides the time-slot book keeper to free the corresponding N[Eq] time-slots and signals "Bridge Release Indication, TPN[Eq], E" to the downstream end 102. Similarly, on receiving "Bridge Release Request, TPN[Er], E", the upstream protection controller commands the switch fabric to drop the bridge of the extra traffic for the Er on protect. The upstream protection controller guides the time-slot book keeper to free the corresponding N[Er] time-slots and signals "Bridge Release Indication, TPN[Er], E" to the downstream end 102.

The downstream protection controller on receiving "Bridge Release Indication for TPN [Ep], E; TPN [Eq], E and TPN [Er], E" from the upstream end 101 caches the information. Since, all the release notifications have happened for the Ep, Eq and Er extra traffic client entities, the downstream protection controller now signals "Bridge Engage Request, TPN[Wx], W" towards the upstream end 101 requesting it to bridge the traffic tor Wx. On receiving the "Bridge Engage Request, TPN[Wx], W" from the downstream end 102, the upstream protection controller requests the time-slot book keeper to grant a list of free N[Wx] time slots. The time-slot book keeper then grants a list of free N[Wx] time-slots to the protection controller. The protection controller on this successful grant of a list of N[Wx] time-slots, bridges the traffic of Wx on the protect on these time-slots. It finally signals this act by sending message "Bridge Engage Indication, TPN [Wx], W" to the downstream end. On receiving the indication of bridging done on the upstream end 101 for Wx via the message "Bridge Engage Indication, TPN[Wx], W" at the upstream end 101, the downstream protection controller commands the switch fabric to switch the traffic from protect on for Wx.

Figure 10:
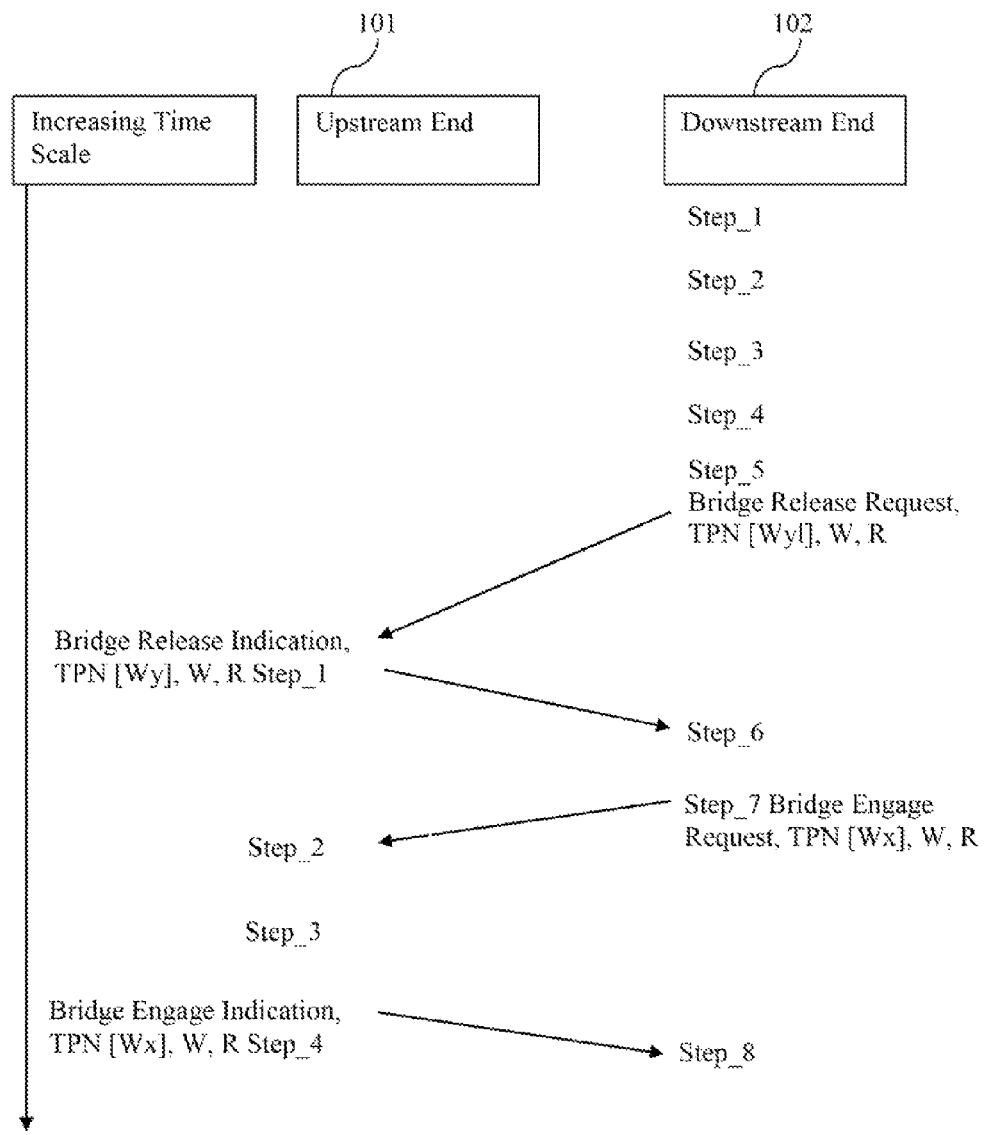
FIG. 10 is an exemplary illustration of a signaling process of knocking-off one of the already protected work entities (Wy) to provide for required number of time-slots to protect the work entity Wx, according to an embodiment of the present disclosure.

FIG. 10 is an exemplary illustration of a process of knocking-off one of the already protected work entity Wy to provide for required number of time-slots to protect the work entity Wx, according to an embodiment of the present disclosure. Consider a condition wherein a work entity Wy is already being protected due to a signal degrade on it and now a signal fail happened on the work entity Wx and there are no protect timeslots available and all of them are used to service some request which are of higher priority than signal fail. Hence in this case, the downstream timeslot controller will free up the protect time slots already protecting Wy which has a lower priority request on it i.e signal degrade. At the downstream end, on failure on Wx, the downstream protection controller checks if there is any lockout on Wx. The lockout may be due to manual lockout done by the operator or automatic lockout due to UDI alarm due to upstream failure. In case, there is a lockout on Wx no action is taken. In case there is no lockout on Wx, the downstream protection controller requests the time-slot controller for N[Wx] number of time-slots.

The downstream time-slot controller based on the above mentioned conditions decides to drop the already protected Wy and free up the necessary time-slots. The time-slot controller conveys to the protection controller to drop the protection on Wy. The protection controller commands the switch fabric to switch back the traffic on Wy to the work path from the protect path and signals "Bridge Release Request, TPN [Wy], W" towards the upstream end.

On receiving "Bridge Release Request, TPN[Wy], W" from the downstream end, the upstream protection controller commands the switch fabric to drop the bridge of the Wy work traffic and tells the time-slot book keeper to free the corresponding N[Wy] time-slots. The upstream protection controller then signals "Bridge Release Indication, TPN[Wy], W" to the downstream end.

The downstream protection controller on receiving "Bridge Release Indication, TPN[Wy], W" caches the information and signals "Bridge Engage Request, TPN[Wx], W" towards the upstream end requesting it to bridge the traffic for Wx.

On receiving "Bridge Engage Request, TPN[Wx], W" from the downstream end, the upstream protection controller request the time-slot book keeper to grant a list of free N[Wx] time slots. The time-slot book keeper grants a list of free N[Wx] time-slots to the upstream protection controller. The protection controller on this successful grant of a list of N[Wx] time-slots, bridges the traffic of Wx on the protect on these time-slots. It finally signals this act by sending message "Bridge Engage Indication, TPN[Wx], W" to the downstream end.

On receiving the indication of bridging done on the upstream end for Wx via the message "Bridge Engage Indication, TPN[Wx], W" from the upstream end, the downstream protection controllers commands the switch fabric to switch the traffic from protect on for Wx.

Figure 11:
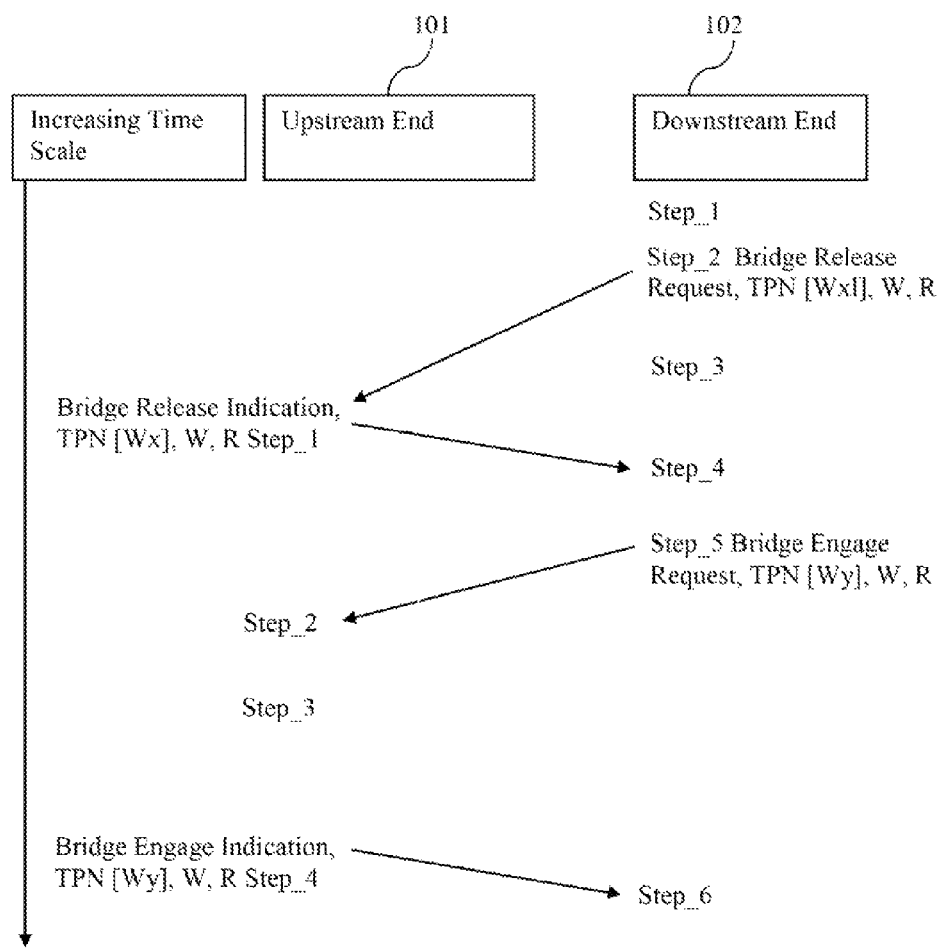
FIG. 11 is an exemplary illustration of a signaling process for clearing of signal fail on the defective work entity (Wx) and switching the traffic back to work for the Wx while restoring the knocked-off failed Wy on the protect, according to another embodiment of the present disclosure.

FIG. 11 is an exemplary illustration of a process for clearing of signal fail on the defective work entity (Wx) and switching the traffic back to work, according to another embodiment of the present disclosure.

In continuance with the example of FIG. 10, consider if signal fail on work entity Wx is cleared and now instead of entering into next priority level WTR for Wx, Wx will be immediately switched back to work since the protect time slots now need to be used to protect Wy which still has signal degrade on it (Wy was earlier knocked-off to free up time-slots to protect Wx).

On clearance of signal fail on Wx work, the downstream protection controller decides to switch back the traffic on Wx on the work immediately so as to free up the protect time-slots to be used to protect Wy which still has signal defect on it and commands the switch fabric to switch the traffic of Wx back from work. The protection controller signals "Bridge Release Request, TPN[Wx], W" to the upstream end and feeds release request for Wx to the time-slot controller. The downstream time-slot controller on seeing release request for N[Wx] time-slots, commands the protection controller to protect Wy as those many time-slots are now free.

On receiving "Bridge Release Request, TPN[Wx], W" from the downstream end, the downstream protection controller commands the switch fabric to drop the bridge of the Wx work traffic, instructs the time-slot book keeper to free the corresponding N[Wx] time-slots and signals "Bridge Release Indication, TPN[Wy], W" to the downstream end.

On receiving, "Bridge Release Indication, TPN[Wx], W" from the upstream end the downstream protection controller caches the information and send "Bridge Engage Request, TPN[Wy], W" signal to the upstream end.

The upstream protection controller on receiving "Bridge Engage Request, TPN[Wy], W", requests the time-slot book keeper to grant a list of free N[Wy] time slots. The time-slot book keeper grants a list of free N[Wy] time-slots to the protection controller.

The upstream protection controller on successful grant of a list of N[Wy] time-slots, bridges the traffic of Wy on the protect on these time-slots. It finally signals this act by sending message "Bridge Engage Indication, TPN[Wy], W" to the downstream end. The downstream protection controller on receiving "Bridge Engage Indication, TPN[Wy], W" from the upstream end commands the switch fabric to switch the traffic from protect for Wy.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The embodiments of the present disclosure provides a flexibility of forming a protection group comprising a higher capacity protect ODU and plurality of work ODUs of different capacities, which in turn provides for a flexibility of network management with respect to forming a protection group.

The embodiments of the present disclosure further offers handling multiple work ODU failures and protecting the work ODU failures using the bandwidth available on the higher capacity protect ODU.

The method for protecting multiple work ODU failures in an Optical Transport Network of the present disclosure uses a TPN-based policy which totally eliminates the need to communicate the time-slots of the protect client ODUs inside server protect ODU. Hence, in the protocol bytes no additional time-slot information needs to be communicated. Also the messaging protocol is simple and converges quite fast.

The present method offers a protocol messaging to achieve the agreement between the transmit and receive ends for the transmit end bridging and the receive end switching. If the downstream end detects the UDI alarm, it leads to automatic lockout of the respective work entity from using the protection by the downstream protection controller. This is mostly done in case of pass through connection of work ODU in which case if there is an upstream failure, then there is no use on protecting that work ODU. This leads to an intelligent optimized protect bandwidth usage.

Although the embodiments herein are described with various specific embodiments, it will be obvious for a person skilled in the art to practice the disclosure with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

We claim:

1. A method for protecting traffic of a plurality of work ODUs over a protect ODU (Optical Channel Data Units), said method comprising the steps of:
   detecting defects in at least one of a plurality of work ODUs;
   requesting for release of one or more time-slots for a defective work ODU;
   allocating the one or more time-slots from the protect ODU based on the request, wherein the one or more time slots are allocated in an incremental manner of priority;
   inputting a signal status of at least one of the plurality of work ODUs and the protect ODU;
   analyzing the availability of time-slots;
   dropping at least one of a plurality of low priority extra traffic client entities and protected work ODUs when free time-slots are not available;

providing a list of free time slots for protecting the defective work ODU; and switching the traffic from the protect ODU for protecting the defective work ODU;

signaling a bridge release request for the dropped low priority extra traffic client entities and the protected work ODUs;

releasing a bridged traffic for the extra traffic client entities and the protected work ODUs on receiving the bridge release request;

providing a bridge release indication;

caching a signaling information on receiving the bridge release indication;

signaling a bridge engage request to bridge traffic for the defective work ODU;

requesting for a grant of free time-slots for the defective work ODU for which the bridge engage request is received;

bridging the traffic for the defective work ODU on the protect ODU;

signaling the bridging of traffic by sending a bridge engage indication; and switching the traffic of the defective work ODU from the protect ODU on receiving the bridge engage indication.

2. The method of claim 1, further comprises defining a policy to channelize lower order ODUs inside a higher order protect ODU, wherein the policy includes a TPN based policy where each of the work entity is assigned with a unique TPN.

3. A system for protecting traffic of a plurality of work ODUs (Optical Channel Data Units) over a protect ODU, the system comprising:

a signal monitor to monitor signal status of the plurality of work ODUs and the protect ODU;

a time-slot controller to determine a number of timeslots to protect the defective work ODU;

a time-slot book-keeper for providing a list of available time slots for protecting the defective work ODU;

a switch fabric to bridge or switch the traffic for the ODUs; and a protection controller to provide instruction to allocating one or more time-slots of a low priority traffic from the protect ODU to protect the defective work ODU;

a downstream protection controller to request for release of time-slots for a defective work ODU based on the signal status indications provided by the signal monitor, said downstream protection controller further configured to command a switch fabric and send bridge engage and drop requests to the upstream end as commanded by the time-slot controller;

a downstream time-slot controller to determine the number of timeslots necessary to protect the defective work ODU, said downstream time-slot controller further configured to command the downstream protection controller to drop a plurality of lower priority extra traffic client entities and the protected work ODUs;

a downstream switching fabric for engaging/dropping at least one of the work ODUs and extra traffic client entities inside protect ODU;

a downstream overhead monitor for providing the received overhead bytes to the downstream protection controller and transmit the overhead bytes provided by the protection controller;

a time-slot book-keeper for maintaining and providing a list of free time slots for protecting the defective work ODU for which the downstream end has sent a bridge engage request;

an upstream protection controller to request for a grant of list of free time slots to the time-slot book-keeper;

an upstream overhead monitor for providing the received overhead bytes to the protection controller and transmit the overhead bytes provided by the protection controller; and an upstream switch fabric to engage and drop bridge of the traffic for the work ODUs and extra traffic client entities on the protect ODU based on instructions from the protection controller.

4. The system of claim 3, wherein the downstream protection controller is further adapted to:

command the downstream switch fabric to drop the extra traffic client entities inside the protect ODU to get the timeslots;

command the downstream switching fabric for dropping protected work ODUs inside the protect ODU to get the timeslots;

signal bridge release request for the dropped extra traffic client entities and protected work ODUs to the upstream end;

cache the signaling information on receiving a bridge release indication from the upstream end;

transmit the signal bridge engage request towards the upstream end to bridge traffic for the defective work ODU on reception of bridge release notifications for the dropped extra traffic client entities and protected work ODUs from the upstream end; and command the switch fabric to switch the traffic from protect for work ODU on receiving the indication of bridging done on the upstream end.

5. The system of claim 3, wherein at least one of an operator or a network management system assigns a priority to each of the work ODUs and the extra traffic client entities inside the protect ODU.

6. The system of claim 3, wherein the protection related actions at the upstream end and the downstream end are coordinated through a protocol messaging carried over the overhead bytes on the protect ODU.

* * * * *